United States Patent

Aoyama et al.

[11] 4,024,557
[45] May 17, 1977

[54] FILM MAGAZINE HAVING FILM SPEED INDICATING MEANS

[75] Inventors: Keiichi Aoyama; Keeji Kaneko, both of Minami-ashigara; Katsuji Muramatsu; Ikuo Fuutagawa, both of Tokyo, all of Japan

[73] Assignee: Fuji Photo Film Co., Ltd., Minami-ashigara, Japan

[22] Filed: Aug. 1, 1975

[21] Appl. No.: 601,395

[30] Foreign Application Priority Data

Aug. 2, 1974   Japan .................. 49-92419[U]

[52] U.S. Cl. .................. 354/275; 354/21; 354/202; 352/78 C; 242/71.1
[51] Int. Cl.² .................. G03B 17/26
[58] Field of Search .......... 354/21, 58, 275, 202, 354/289; 242/71.1; 206/389, 407, 316; 352/78 C

[56] References Cited
UNITED STATES PATENTS 3,444,795  5/1969  Nerwin .................. 354/21 X
3,667,363  6/1972  Tanaka .................. 354/21
3,669,532  6/1972  Figge et al. .................. 352/78 C

FOREIGN PATENTS OR APPLICATIONS 1,451,597  7/1966  France .................. 352/78 C

*Primary Examiner*—John Gonzales
*Attorney, Agent, or Firm*—Gerald J. Ferguson, Jr.; Joseph J. Baker

[57] ABSTRACT

A film magazine comprised of a cylindrical portion and a pair of end covers is provided with film speed indicating code means. The cylindrical portion of the film magazine is made of metal sheet applied with an insulating coating layer. The surface of the cylindrical portion is selectively provided with non-coated sections for indicating the film speed of the film loaded therein in accordance with a binary code system. The code which indicates the film speed is sensed by a small number of sensing contacts provided in the camera body. The non-coated sections for indicating the film speed are located in the inaccessible area of the film magazine so that the coding sections may not be damaged.

8 Claims, 8 Drawing Figures

| SENSING CONTACT / FILM SPEED | d | e | f | g | h |
|---|---|---|---|---|---|
| ASA 16 | ▨ | | | | ▨ |
| ASA 32 | ▨ | | | ▨ | |
| ASA 40 | ▨ | | | ▨ | ▨ |
| ASA 50 | ▨ | | ▨ | | |
| ASA 64 | ▨ | | ▨ | | ▨ |
| ASA 80 | ▨ | | ▨ | ▨ | |
| ASA 100 | ▨ | | ▨ | ▨ | ▨ |
| ASA 125 | ▨ | ▨ | | | |
| ASA 160 | ▨ | ▨ | | | ▨ |
| ASA 200 | ▨ | ▨ | | ▨ | |
| ASA 320 | ▨ | ▨ | | ▨ | ▨ |
| ASA 400 | ▨ | ▨ | ▨ | | |
| ASA 640 | ▨ | ▨ | ▨ | | ▨ |
| ASA 800 | ▨ | ▨ | ▨ | ▨ | |
| ASA 1000 | ▨ | ▨ | ▨ | ▨ | ▨ |

| FILM SPEED \ SENSING CONTACT | d | e | f | g | h |
|---|---|---|---|---|---|
| ASA 100 | ▨ | ▨ | | | |
| ASA 200 | ▨ | | ▨ | | |
| ASA 400 | ▨ | | | ▨ | |
| ASA 800 | ▨ | | | | ▨ |

FILM MAGAZINE HAVING FILM SPEED INDICATING MEANS

BACKGROUND OF THE INVENTION

1. Field of the Invention

This invention relates to a film magazine for a roll film, and more particularly to a film magazine for a roll film having cylindrical shape which is provided with film speed indicating means to be sensed by a film speed sensing means equipped in a photographic camera.

2. Description of the Prior Art

As disclosed in U. S. Pat. No. 2,492,928, it has been known in the art to provide on the outer surface of a film magazine of cylindrical shape an electric contact member for short-circuiting a resistor provided in a diaphragm control circuit comprising a diaphragm control means, a photocell and a power source. The size or length of the electric contact member provided on the outer surface of the film magazine is determined with respect to the film speed of the film loaded in the film magazine so that a part of the resistor may be short-circuited to drive the diaphragm control means by the degree corresponding to the brightness of the object to be photographed measured by the photocell. In order to sense the length of the electric contact member and short-circuit the resistor by the length corresponding to the film speed, there are a number of electric brushes provided in the camera body to be put into contact with the electric contact member. The number of electric brushes occupy a large space in the camera body and make it difficult to effect uniform electric contact between the number of brushes and the contact member. Owing to the uneven contact between the brushes and the contact member, malfunction of the diaphragm control means will often occur.

Further, since the electric contact member provided on the surface of the conventional film magazine for indicating the film speed of the film loaded therein is made of metal plate and is adhered to or partly buried on the surface of the film magazine, the number of processes in the manufacture of the film magazine is increased and the cost of manufacture thereof is increased by the expensive metal material.

In addition, in the conventional film magazine provided with the metal contact member on the outer surface thereof is disadvantageous in that the surface of the contact member is apt to be stained by the sweat of fingers or the like. The stains on the surface of the contact member will often cause malfunction of the electric circuit for controlling the diaphragm.

SUMMARY OF THE INVENTION

In view of the observations and description of the prior art, it is the primary object of the present invention to provide a film magazine with a film speed indicating means which will certainly effect without malfunction in combination of a film speed sensing means provided in the camera body.

Another object of the present invention is to provide a film magazine with a film speed indicating means which will operate an exposure controlling means provided in the camera body by use of a very simple circuit and a small number of electric contacts for sensing the film speed indicating means on the film magazine.

Still another object of the present invention is to provide a film magazine with a film speed indicating means in which the film speed indicating means is made of markedly simple structure which does not effect on the manufacturing cost of the film magazine.

A further object of the present invention is to provide a film magazine with a film speed indicating means which can be sensed by electric sensing means provided in the camera wherein the film speed indicating means is not easily stained by sweat of fingers or the like.

A still further object of the present invention is to provide a film magazine with a film speed indicating means which can be used in the conventional ordinary type photographc cameras having no means for sensing film speed indicated on the film magazine.

The film magazine for cameras having means for indicating film speed of the film loaded therein in accordance with this invention is characterized in that a part of the outer surface of the film magazine made of electrically coductive metal sheet covered with an insulating material such as an organic coating material is not applied with the coating material to expose the conductive metal surface. A particular area of the surface of the film magazine is selectively made conductive by not coating the insulating coating material. The particular area of the surface of the film magazine serving as the film speed indicating means is selected at the inaccessible area behind the projected film outlet slot portion. The surface of the film magazine of cylindircal shape is divided into several sections in said area and is selectively coated with the insulating material to form a combination of uncoated conductive section. The combination represents the film speed of the film loaded in the film magazine.

BRIEF DECRIPTION OF THE DRAWING

FIG. 1 is a perspective view showing an embodiment of the film magazine provided with film speed indicating means in accordance with the present invention, J FIG. 2 is a cross sectional view showing the film magazine in accordance with the embodiment of the present invention as shown in FIG. 1, FIG. 3 is a developed view of a metal sheet which forms the cylindrical portion of the film magazine as shown in FIGS. 1 and 2, FIG. 4 is a table which shows the binary code system comprised of five digits for indicating a number of kinds of film speed from ASA16 to ASA1000, FIG. 5 is a diagram which shows an exposure control circuit to be provided in a camera body for sensing the film speed of a film loaded in the film magazine provided with the film speed indicating means and controlling a diaphragm in accordance with the film speed with reference to the brightness of the object to be photographed, FIG. 6 is a partial perspective view showing a part of the camera body which is provided with a number of film speed sensing contacts located in the vicinity of a film chamber, FIG. 7 is a cross sectional view showing the film magazine and the film sensing contacts which is in contact with the inaccessible area of the film magazine, and FIG. 8 is a table which shows another example of the binary code system comprised of five digits for indicating four kinds of film speed from ASA100 to ASA800.

DESCRIPTION OF THE PREFERRED EMBODIMENTS

Figure 1:
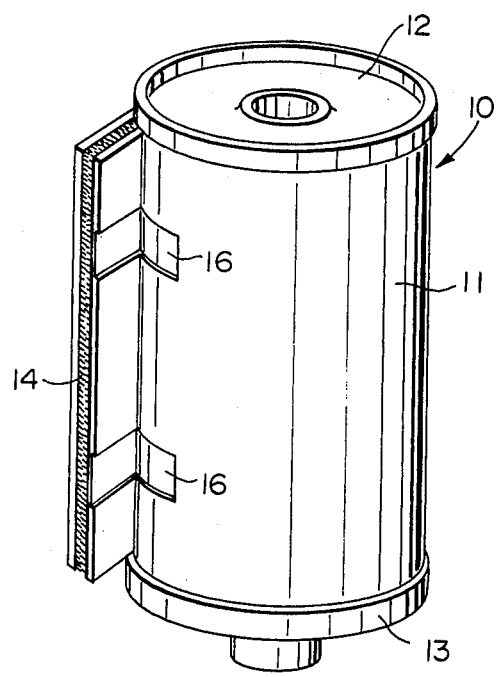
Figure 2:
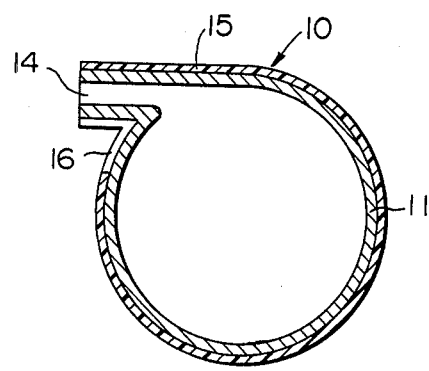

An embodiment of the film magazine in accordance with the present invention is illustrated in FIGS. 1 and 2. The film magazine 10 shown in FIGS. 1 and 2 is of the standard type 35mm roll film and comprises a cylindrical portion 11 and a pair of end covers 12 and 13 both made of electrically conductive metal sheet material. The cylindrical portion 11 is applied with a coating layer 15 to improve the appearance of the film magazine and make it possible to print the name of the film, the name of the film manufacturer and other information thereon. The coating layer 15 is made of electrically insulating material. The inaccessible area of the outer surface of the cylindrical portion 11 behind a film outlet slot portion 14 is provided with non-coated sections 16 which extends from the outer surface of the cylindrical portion 11 to the inside face of the film outlet slot portion 14 as shown in FIGS. 1 and 2.

Figures 3, 4:
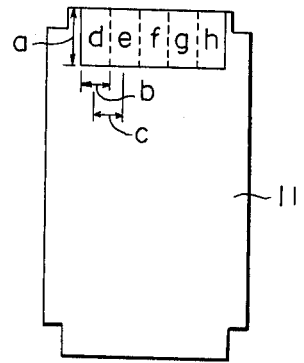

In the embodiment of the present invention as illustrated in FIGS. 3 and 4, the inaccessible area of the film magazine 10 is divided into five sections $d, e, f, g$ and $h$ which have a length of $a$ in the direction of film feed, a width of $b$ and an interval of $c$. The five sections $d$ to $h$ are selectively made conductive by not being coated with the insulating coating layer in accordance with a predetermined binary systems of code. FIG. 4 shows an example of a code system indicated by the five sections $d$ to $h$ in accordance with a binary system to indicate 15 kinds of film speed. The film speed is represented in terms of ASA in FIG. 4. In FIG. 4, hatched sections 21 show the non-coated sections which serve as electrically conductive contacts and non-hatched sections 22 show coated electrically insulating sections. For instance, in case of ASA100, four sections $d, f, g$ and $h$ are not coated with the insulating material and one section $e$ is coated therewith.

It will be readily understood by those skilled in the art that the number, size and shape of the non-coated sections are not limited to those as illustrated. Further, the conductive metal sheet forming the cylindrical portion 11 of the film magazine 10 may be of any material as long as it is conductive and not liable to be rusted by the ordinary use thereof. Preferably, a steel sheet material plated with chromium or nickel is used therefor.

Figure 5:
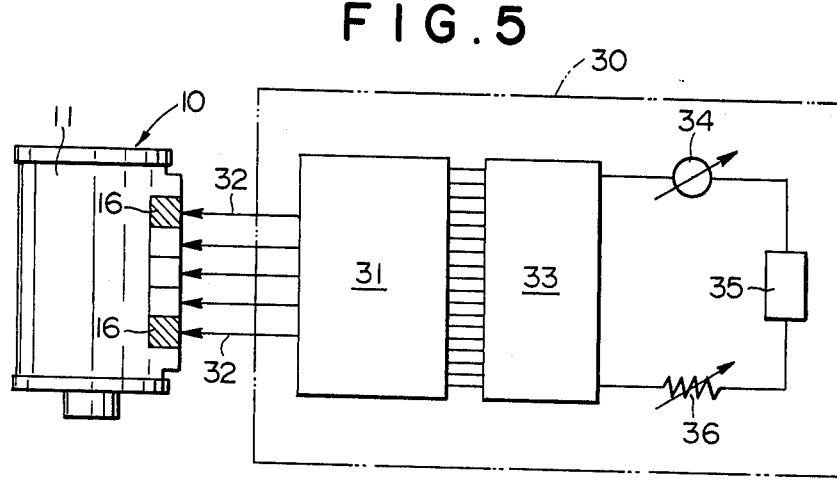
Figure 6:
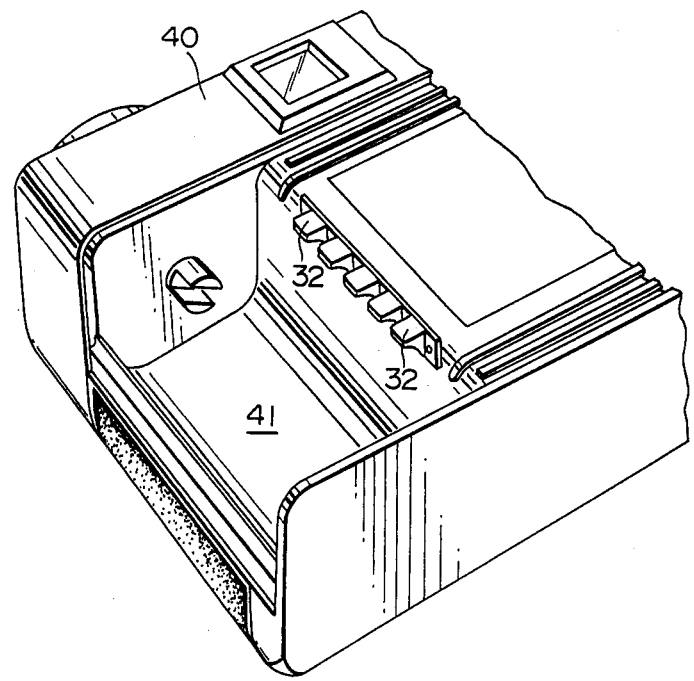

An exposure control circuit provided in the camera body to control the exposure in accordance with the brightness of the object to be photographed with reference to the film speed sensed by use of a film speed sensing means for sensing the film speed indicating means provided on the film magazine is illustrated in FIG. 5. The exposure control circuit 30 comprises a decoder 31 having sensing contacts 32 to sense said conductive non-coated sections 16 on the film magazine 10, an operating circuit 33 connected with the decoder 31 to convert the signal from the decoder which represents the film speed of the film loaded in the film magazine 10 to an exposure control signal, a diaphragm controlling means 34 for controlling a diaphragm opening by the output from the operating circuit 33 and a photocell 35 for measuring the brightness of the object to be photographed. Practically, a variable resistor 36 is further connected in the circuit 30 for input of exposure information such as preset shutter speed.

In operation of the exposure control circuit 30 as described above, the sensing contacts 32 senses the non-coated conductive sections 16 provided on the surface of the film magazine 10 when the film magazine is put into the camera body. Since the combination of the non-coated conductive sections 16 indicates concerning the film speed is transmitted to the decoder 31 of the exposure circuit 30. The decoder 31 gives the information to the operating circuit 33 which converts the information to an output indicative of the film speed to be transmitted to the diaphragm controlling means 34. Since the diaphragm controlling means 34 is further provided with information from the photocell 35 which indicates the brightness of the object to be photograph and from the variable resistor 36 which indicates the shutter speed, the diaphragm (not shown) is controlled thereby to effect the optimum exposure to obtain a photograph of normal exposure.

Figures 7, 8:
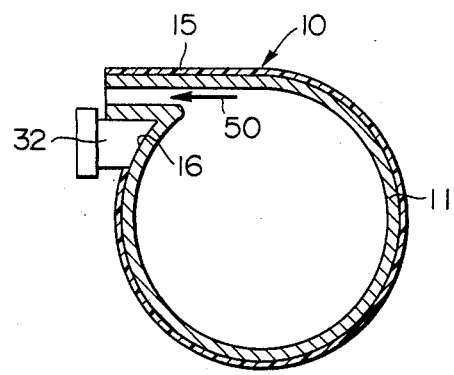

In the camera, said sensing contacts 32 are provided in the vicinity of a film chamber 41 of a camera body 40 so that the non-coated sections 16 of the film magazine 10 may be put into contact therewith when the film magazine is loaded in the film chamber as shown in FIG. 7. Since the film is pulled out of the film magazine 10 in the direction as shown by the arrow 50 in FIG. 7, the inaccessible area of the film magazine 10 carrying said non-coated conductive sections 16 is urged to be in sufficient contact with the sensing contacts 32. Therefore, the exposure control circuit is assured to operate without malfunction.

Since the film magazine is provided with non-coated conductive sections selectively provided in accordance with a predetermined binary system, the number of the sections and accordingly the number of sensing contacts provided in the camera body is markedly reduced. Therefore, the structure of the film speed sensing means in the camera is considerably simplified.

Although the above embodiment of the present invention employs an exposure control circuit which controls a diaphragm, it will be understood by those skilled in the art that the present invention is applicable also to an exposure control camera in which the shutter speed, or the shutter speed and the diaphragm are controlled.

Further, it will readily be understood by those skilled in the art that the binary system of the code for the film speed indicating sections 16 may be far more simplified that employed in the embodiment shown in FIG. 4. For instance, in case that four film speeds are to be indicated by the code, five sections $d, e, f, g,$ and $h$ can be used as illustrated in FIG. 8 wherein hatched sections 61 indicate non-coated sections 16 and not-hatched sections 62 indicate the insulating sections.

We claim:

1. A film magazine having film speed indicating means for a camera loaded with a roll film comprising
    a cylindrical portion made of metal sheet applied with an insulating coating layer, said cylindrical portion being provided with a film outlet slot portion, and
    a pair of end covers fixed at the opposite ends of the film magazine,
    the improvement comprising a film speed indicating means provided on the cylindrical portion of the film magazine, said film speed indicating means being comprised of selectively provided non-coated conductive sections of said cylindrical portion of the film magazine, said sections being selectively provided in an inaccessible portion of the film magazine in accordance with a predetermined binary code system wherein said inaccessible portion is an area behind said film outlet slot portion.

2. A film magazine having film speed indicating means for a camera as defined in claim 1 wherein said film outlet slot portion is projected out of the cylindrical portion.

3. A film magazine having film speed indicating means for a camera as defined in claim 2 wherein said film outlet slot portion is made of the same material as that of the cylindrical portion and has non-coated conductive sections connected with said non-coated conductive sections of the cylindrical portion.

4. A film magazine having film speed indicating means for a camera as defined in claim 3 wherein the face of the non-coated sections of said film outlet slot portion are inclined at an acute angle with respect to the face of the non-coated sections of the cylindrical portion.

5. A film magazine having film speed indicating means for a camera as defined in claim 2 wherein said film outlet slot portion is opened in the direction tangential to the outermost convolution of the roll film loaded in the film magazine.

6. A film magazine having film speed indicating means for a camera as defined in claim 5 wherein said film outlet slot portion has non-coated conductive sections connected with said non-coated conductive sections of the cylindrical portion.

7. A film magazine having film speed indicating means for a camera as defined in claim 2 wherein said cylindrical portion and said film outlet slot portion are made from a pressed sheet of metal.

8. A film magazine having film speed indicating means for a camera as defined in claim 7 wherein said sheet of metal is provided with non-coated conductive sections extending over a part of a line at which the sheet of metal is bent when pressed.

* * * * *